(12) United States Patent
Al Mattar

(10) Patent No.: US 9,331,548 B1
(45) Date of Patent: May 3, 2016

(54) DEVICES AND SYSTEMS FOR GENERATING SUSTAINABLE ENERGY FROM TRAFFIC

(71) Applicant: Mohammed Al Mattar, Mankato, MN (US)

(72) Inventor: Mohammed Al Mattar, Mankato, MN (US)

( * ) Notice: Subject to any disclaimer, the term of this patent is extended or adjusted under 35 U.S.C. 154(b) by 0 days.

(21) Appl. No.: 14/565,028

(22) Filed: Dec. 9, 2014

(51) Int. Cl.
*F03G 5/00* (2006.01)
*H02K 7/18* (2006.01)
*H02K 7/075* (2006.01)
*F03G 7/08* (2006.01)

(52) U.S. Cl.
CPC ............... *H02K 7/1853* (2013.01); *F03G 7/08* (2013.01); *H02K 7/075* (2013.01)

(58) Field of Classification Search
CPC ....................................................... F03G 5/00
USPC ....................................................... 290/1 R
See application file for complete search history.

(56) References Cited

U.S. PATENT DOCUMENTS

| | | | | |
|---|---|---|---|---|
| 1,391,503 | A * | 9/1921 | Register | F03G 7/08 417/229 |
| 2,333,614 | A * | 11/1943 | Boyd | F04B 3/0063 417/229 |
| 4,004,422 | A * | 1/1977 | Le Van | F03G 7/08 417/229 |
| 4,130,064 | A * | 12/1978 | Bridwell | F04B 17/00 104/154 |
| 4,238,687 | A | 12/1980 | Martinez | |
| 4,322,673 | A * | 3/1982 | Dukess | F03G 7/08 290/55 |
| 4,339,920 | A * | 7/1982 | Le Van | F03G 7/08 417/229 |
| 4,409,489 | A * | 10/1983 | Hayes | F03G 7/08 290/1 R |
| 4,739,179 | A | 4/1988 | Stites | |
| 6,172,426 | B1 | 1/2001 | Galich | |
| 7,102,244 | B2 * | 9/2006 | Hunter, Jr. | B60L 11/182 290/1 R |
| 7,141,888 | B2 * | 11/2006 | Sabol | B60L 7/003 290/42 |
| 8,148,833 | B2 | 4/2012 | Chang et al. | |
| 2007/0085342 | A1 * | 4/2007 | Horianopoulos | F03G 7/08 290/1 R |
| 2007/0246940 | A1 * | 10/2007 | Fajardo Valon | F03G 7/08 290/1 R |

FOREIGN PATENT DOCUMENTS

WO    WO 94/13953    6/1994

OTHER PUBLICATIONS

K.Ravivarma, et al., "Power Generation Using Hydraulic Mechanism at Speed bumper", International Journal of Scientific & Engineering Research, vol. 4, Issue 6, Jun. 2013, http://www.ijser.org/paper/Power-Generation-Using-Hydraulic-Mechanism-at-Speed-bumper.html.

* cited by examiner

*Primary Examiner* — Joseph Waks
(74) *Attorney, Agent, or Firm* — Oblon, McClelland, Maier & Neustadt, L.L.P

(57) ABSTRACT

A device that is installed underneath a predetermined surface to harness gravity from the weight of overpassing traffic to produce and amplify mechanical energy. The weight received forces or pushes the device downward thereby translating the weight into mechanical energy. The amplification of mechanical energy is achieved through the decrease in the cross section area from the upper portion to the lower portion of the device. Also provided herein is a system wherein the device is connected to a piston, a crankshaft and an electricity generator so that the mechanical energy can be further converted into rotational motion and ultimately, electricity.

20 Claims, 9 Drawing Sheets

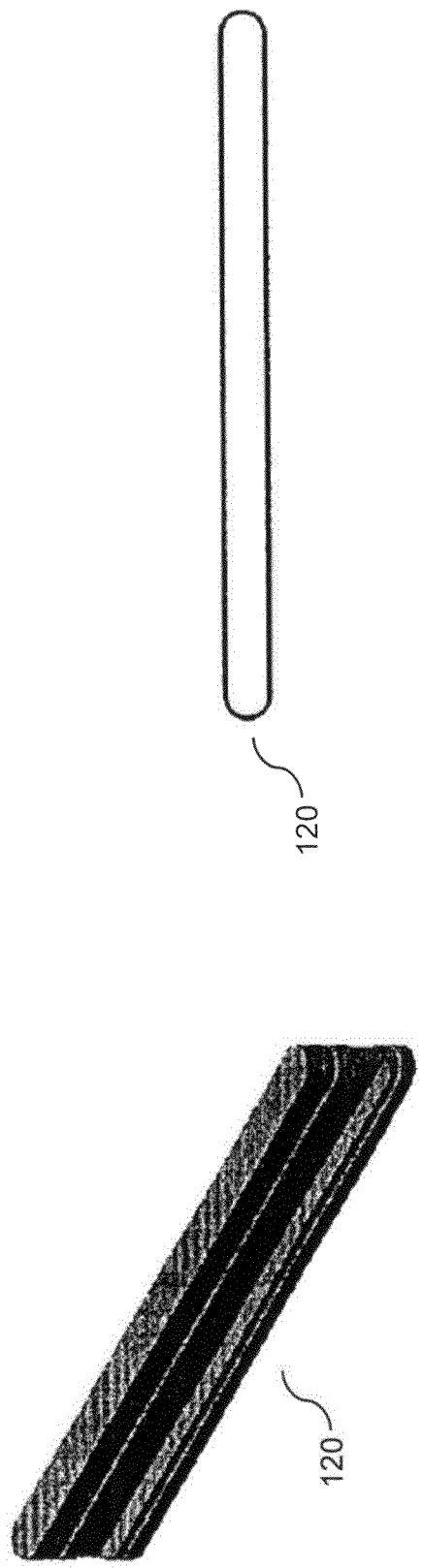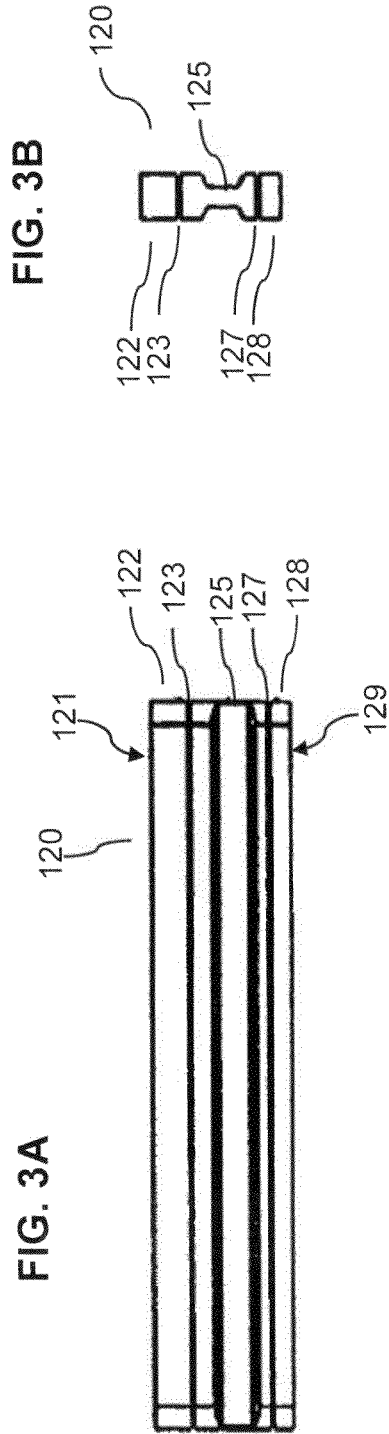
FIG. 3A
FIG. 3B
FIG. 3C
FIG. 3D

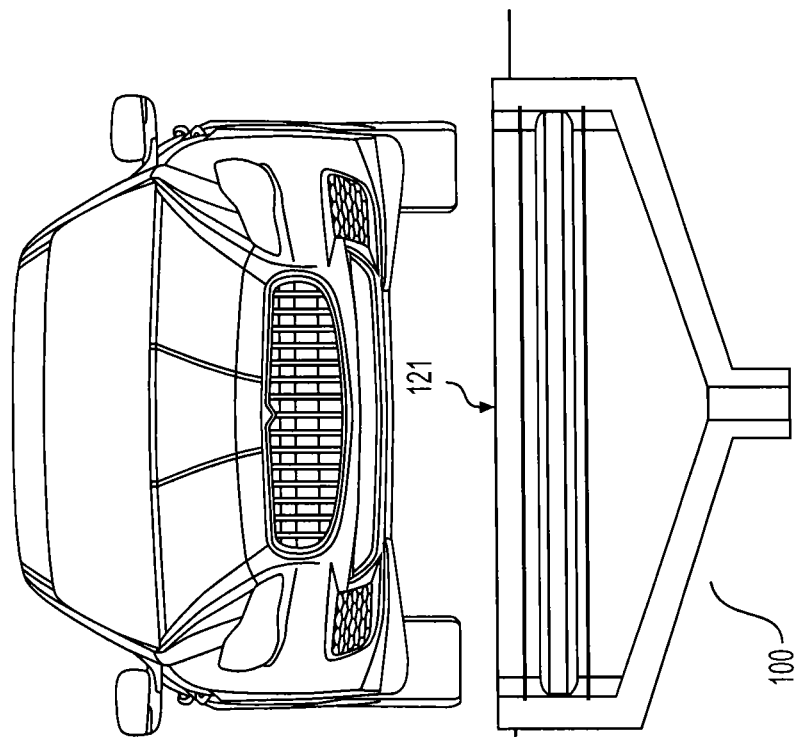
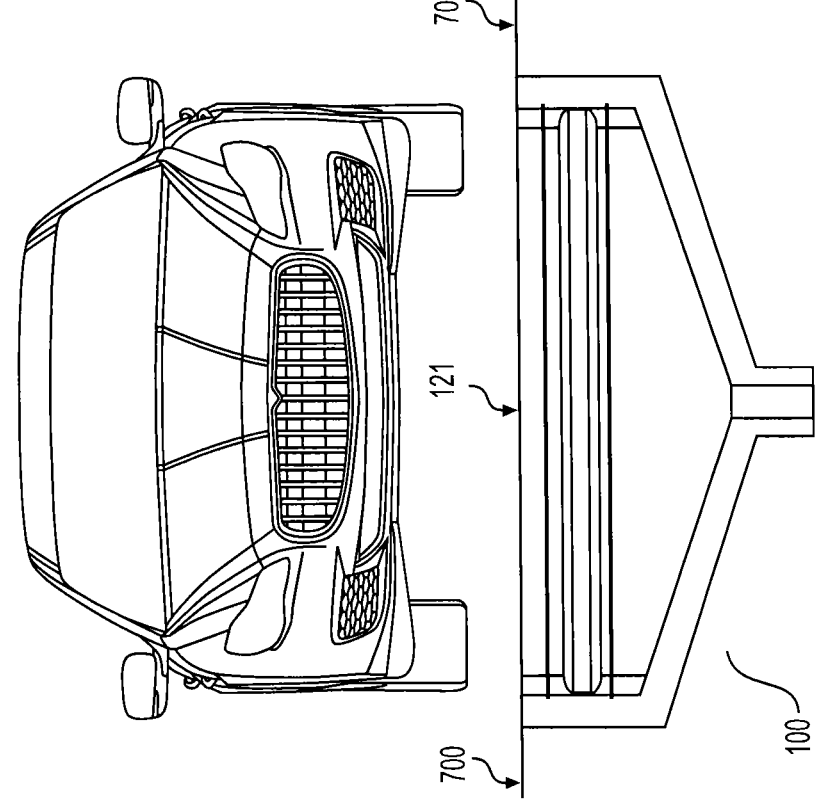

DEVICES AND SYSTEMS FOR GENERATING SUSTAINABLE ENERGY FROM TRAFFIC

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

FIELD OF THE DISCLOSURE

The present invention relates to devices and systems for generating energy from traffic. More particularly, the present invention relates to devices, systems and methods for harnessing the weight of vehicles and pedestrians to generate mechanical energy and electrical energy.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The rapid increase in global demand for energy, spurred by growing human population and dramatic economic growth in developing countries like China and India, has resulted in an urgent need for developing methods of optimal utilization of energy and creating viable alternative energy resources.

Traffic, especially vehicles with internal combustion engines, is a huge source of air pollution. However, traffic could also be a source of clean and sustainable energy. For example, the kinetic energy lost as a vehicle passes by a speed bump can be recovered, at least partially for other useful purposes such as generating power. Wind currents generated by moving vehicles can also be used to drive a turbine and generate electricity. Alternatively or additionally, the weight of the vehicle naturally imposes gravity force on the speed bump, thereby presenting another energy source that can be harnessed for power generation.

SUMMARY

A non-limiting objective of the present disclosure is to provide devices, systems and methods for harnessing gravity from the weight of traffic, especially vehicles and pedestrians and converting the force into mechanical energy and electrical energy.

According to a first aspect, the present disclosure provides a device for converting the weight of an overpassing vehicle or pedestrian into mechanical energy. The device comprises a vessel of a rectangular funnel shape having a rectangular mouth and a rectangular cross section at an upper portion, a reservoir in a middle portion, a stem with a circular cross section at a lower portion, a movable platform having an I-shaped cross section disposed inside the upper portion and enclosed by the rectangular mouth, the movable platform including a top treadle area, a top flange, a bottom flange and a central web channel disposed between the top flange and the bottom flange, a piston disposed inside the stem at the lower portion and an incompressible fluid contained in the reservoir and is in contact with the movable platform and the piston. The rectangular cross section is greater than the circular cross section. The movable platform is configured to receive the weight of the overpassing vehicle or pedestrian at the top treadle area and drop to produce an upstream vertical displacement. The incompressible fluid is configured to receive the upstream vertical displacement from the movable platform and to transfer the upstream vertical displacement to the piston. The piston is configured to receive the upstream vertical displacement from the incompressible fluid and drop to produce a downstream vertical displacement. The downstream vertical displacement is greater than the upstream vertical displacement.

In one or more embodiments, the device further comprises a stopper disposed inside the central web channel across the width of the vessel and is joined to at least two inners walls of the vessel. The central web channel has a width that is greater than the width of the stopper and the stopper is configured to control and limit the upstream vertical displacement.

In one or more embodiments, the device further comprises one or more elastomeric gasket strips wrapping around the movable platform. The elastomeric gasket strips are configured to fill spaces between the movable platform and the vessel, to prevent leakage of the incompressible fluid and to return the movable platform to the original movable platform position after the movable platform is released from the weight of the overpassing object.

In one or more embodiments, the downstream vertical displacement is one to two orders of magnitude greater than the upstream vertical displacement. In one or more embodiments, the downstream vertical displacement is within the range of 0.5 m-2.5 m. In one or more embodiments, the upstream vertical displacement of within the range of 0.05-0.25 cm.

In one or more embodiments, the device is constructed of a rigid, non-flexible metallic material selected from the group consisting of aluminum, iron, copper, mixtures and alloys thereof.

In one or more embodiments, the device is installed underneath a predetermined surface selected from the group consisting of road surface, rail surface, floor surface, surface of a walking area, a weigh station checkpoint along a highway and a pedestrian crosswalk. In one or more embodiments, the top treadle area and the rectangular mouth align with predetermined surface.

In an alternative embodiment, the top treadle area and the rectangular are up to 10 cm above the predetermined surface.

According to a second aspect, the present disclosure provides a system for generating electricity from the weight of an overpassing vehicle or pedestrian. The system comprises at least two devices according to the first aspect of the disclosure, a crankshaft mechanically connected to the devices and an electricity generator connected to the crankshaft. The crankshaft is configured to translate the downstream vertical displacement into rotational motion and return the piston to the original piston position. The electricity generator is configured to convert the rotational motion into electricity.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values and dimensions illustrated in any accompanying graphs and figures are for illustration purposes only and may or may not represent actual or preferred values or dimensions. Where applicable, some or all features may not be illustrated to assist in the description of the underlying features. In the drawings:

FIG. 3A is a perspective view of the movable platform of a gravity harvester according to one embodiment.

FIG. 3B is a top plane view of the movable platform of the gravity harvester of FIG. 3A.

FIG. 3C is a front view of the movable platform of the gravity harvester of FIG. 3A.

FIG. 3D is a side view of the movable platform of the gravity harvester of FIG. 3A.

FIG. 7A illustrates the installation of a gravity harvester underneath a predetermined surface according to one embodiment.

FIG. 7B illustrates the installation of a gravity harvester underneath a predetermined surface according to another embodiment.

DETAILED DESCRIPTION OF THE EMBODIMENTS

Figure 1B:
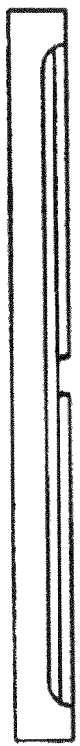
FIG. 1B is a top plane view of the half section of the gravity harvester of FIG. 1A.
Figure 1D:
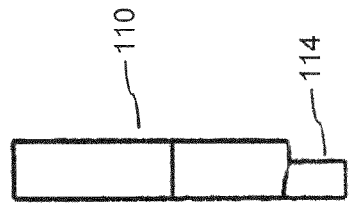
FIG. 1D is a side view of the half section of the gravity harvester of FIG. 1A.

The description set forth below in connection with the appended drawings is intended as a description of various embodiments of the invention and is not necessarily intended to represent the only embodiments in which the invention may be practiced. In certain instances, the description includes specific details for the purposes of providing an understanding of the invention. However, it will be apparent to those skilled in the art that the invention may be practiced without these specific details. In some instances, well-known structures and components may be shown in block diagram form in order to avoid obscuring the concepts of the disclosed subject matter.

Reference through the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Additionally, it must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Further, it is intended that the present invention and embodiments thereof cover the modifications and variations. For example, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit the present invention to any particular orientation or configuration. Furthermore, terms such as "first," "second," "third," etc., merely identify one of a number of portions, components and/or points of reference as disclosed herein, and likewise do not necessarily limit the present invention to any particular configuration or orientation.

The present disclosure relates to a device for harnessing gravity from the weight of traffic, especially but not limited to, land vehicles and pedestrians. As used herein, land vehicles include wheeled, tracked, railed or skied transportation vehicles, such as wagons, bicycles, motor vehicles (e.g. motorcycles, cars, trucks, buses) and trains. The device, a gravity harvester, can be installed underneath a predetermined surface such as a road surface, a rail surface, a floor surface, the surface of any walking area or the surface of area wherein a land vehicle may overpass, such as at a weigh station checkpoint along a highway.

In general, the gravity harvester includes a mechanism for receiving the weight of an overpassing or traversing vehicle or pedestrian, translating the weight into mechanical energy and further transferring and amplifying or augmenting the mechanical energy. In an exemplary embodiment, the mechanism can include a vessel containing a platform, a fluid and a piston. In one or more embodiments, the platform is in a top or upper portion of the vessel, with the fluid contained inside a middle portion of the vessel and the piston disposed at a bottom or lower portion of the vessel. The platform, the fluid and the piston are in fluid communication with one another without any gap.

When a gravity harvester is installed underneath any one of the aforementioned predetermined surfaces, an overpassing vehicle or pedestrian can trample upon the platform of the device. The weight received forces or pushes the platform downward (in the direction of gravity or gravitational force) or causes the platform to drop, thereby translating weight into mechanical energy in the form of an upstream vertical displacement. The mechanical energy is transferred when the displaced platform pushes the fluid in the middle portion which in turn pushes the piston at the lower portion, thereby resulting in a downstream vertical displacement.

The extent or magnitude of upstream vertical displacement of the movable platform can be controlled so that the movement of the traversing vehicle is minimally hampered or impeded.

Advantageously, the downstream vertical displacement of the piston can be amplified in order to amplify the mechanical energy output, which can be achieved in a variety of ways. In an embodiment, the amplification can be achieved through the design of the vessel, for example, a decrease in the cross section area from the upper portion to the lower portion by one to two orders of magnitude. The downstream vertical displacement can then be amplified, also by one to two orders of magnitude, for example, 50 times, 100 times and 500 times.

Referring now to the drawings, wherein reference numerals designate identical or corresponding parts through the several views. FIGS. 1A-1D provide a perspective view, a top plane view, a front view and a side view of a gravity harvester 100, respectively, according to one or more exemplary embodiments of the present disclosure. The gravity harvester is made up of the following components: a vessel 110, a movable platform 120, a stopper 130 and a piston 140, wherein the movable platform 120, the stopper 130 and the piston can be disposed inside the vessel 110 across the width of the vessel. All the components of the gravity harvester 100 can be made of a rigid, non-flexible metallic material such as aluminum, iron, copper, as well as mixtures and alloys thereof (e.g. steel). The stopper 130 is connected to or joined to at least two inner walls of the vessel 110, for example, by way of welding. The movable platform 120 and the piston 140 are inserted into or placed inside the vessel 110.

Figure 1A:
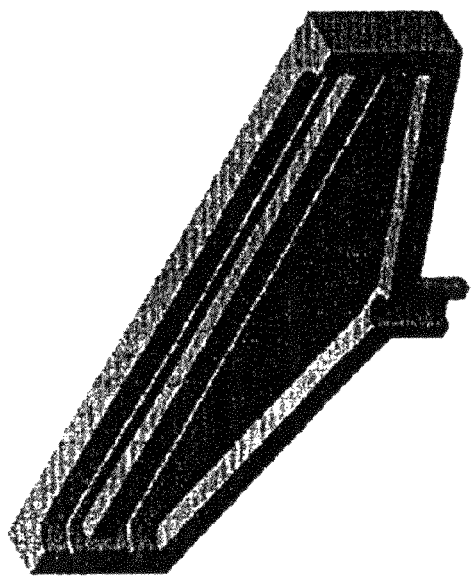
FIG. 1A is a perspective view of a half section of a gravity harvester according to one embodiment, including a vessel, a movable platform and a piston.
Figure 1C:
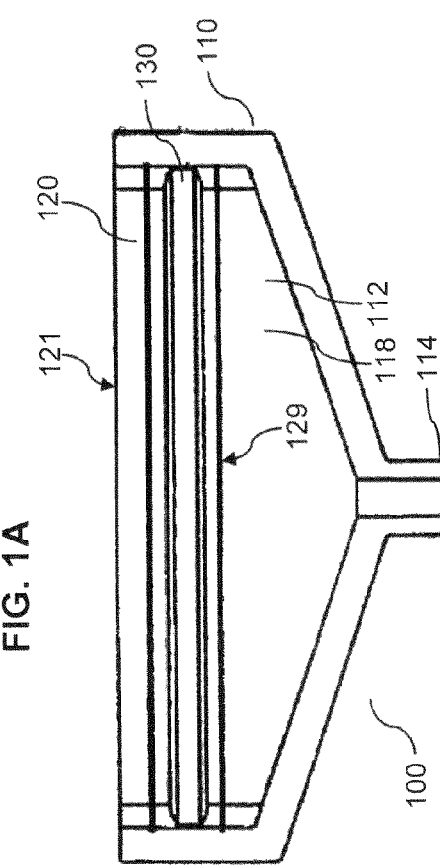
FIG. 1C is a front view of the half section of the gravity harvester of FIG. 1A.
Figure 2B:
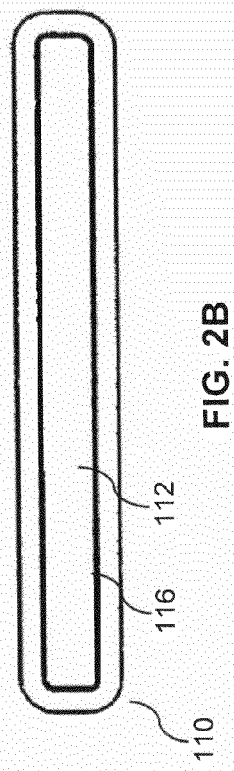
FIG. 2B is a top plane view of the vessel of the gravity harvester of FIG. 2A.
Figure 2D:
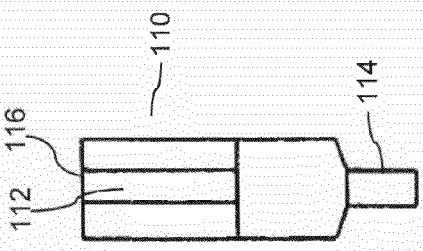
FIG. 2D is a side view of the vessel of the gravity harvester of FIG. 2A.
Figure 2A:
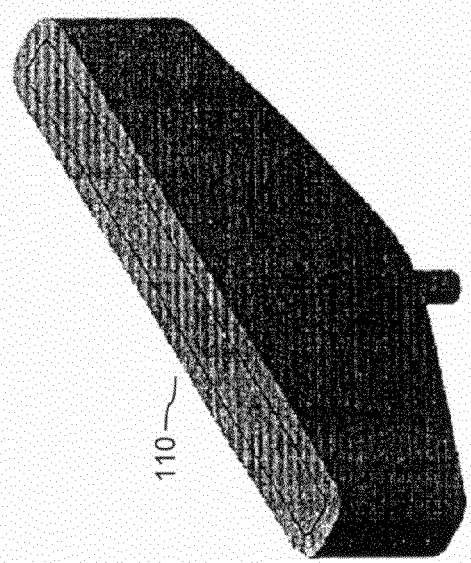
FIG. 2A is a perspective view of the vessel of a gravity harvester according to one embodiment.
Figure 2C:
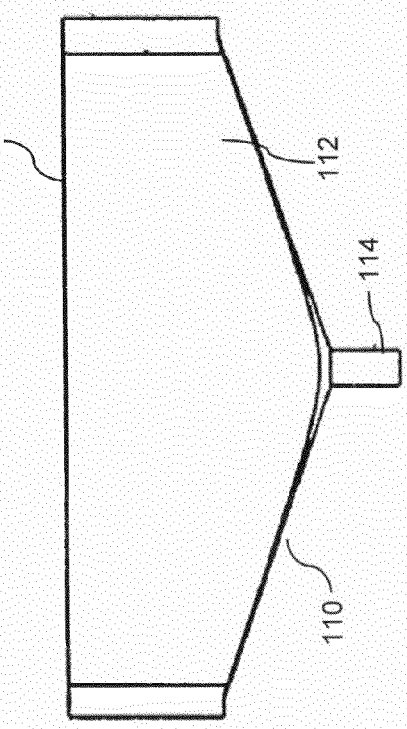
FIG. 2C is a front view of the vessel of the gravity harvester of FIG. 1A.

Referring to FIGS. 2A-2D wherein a perspective view, a top plane view, a front view and a side view of the vessel 110 are provided, respectively, the vessel 110 is of a rectangular funnel shape having a rectangular mouth 116 at the top of the vessel or an upper portion of the vessel, a reservoir 112 below the rectangular mouth 116 in a middle portion that is fillable with a fluid 118 and a stem 114 at a lower portion of the vessel 110 below the reservoir 112. The stem 114, as best shown in FIG. 1A, can be of a narrow, hollow cylindrical shape and is designed so to receive the piston 140.

FIGS. 3A-3D offer a perspective view, a top plane view, a front view and a side view of the movable platform 120, respectively, according to at least one embodiment of the present disclosure. In one or more embodiments, the movable platform 120 can be disposed inside the vessel 110 at the upper portion with top rectangular mouth 116 enclosing the platform with no gap. In one or more embodiments, the movable platform 120 can assume a shape that is similar to an I-beam or H-beam that is commonly used in construction. In other words, as shown in FIG. 3D, the movable platform 120 can have an I- or H-shaped cross section. This comparison to the I-beam is merely for descriptive purposes of the structure and shape of the movable portion 120, and is not intended to refer to any functional similarities. The movable platform 120 can include a top flange 122, a bottom flange 128 and a central web channel 125 that is sandwiched by the top flange 122 and the bottom flange 128.

Figure 4:
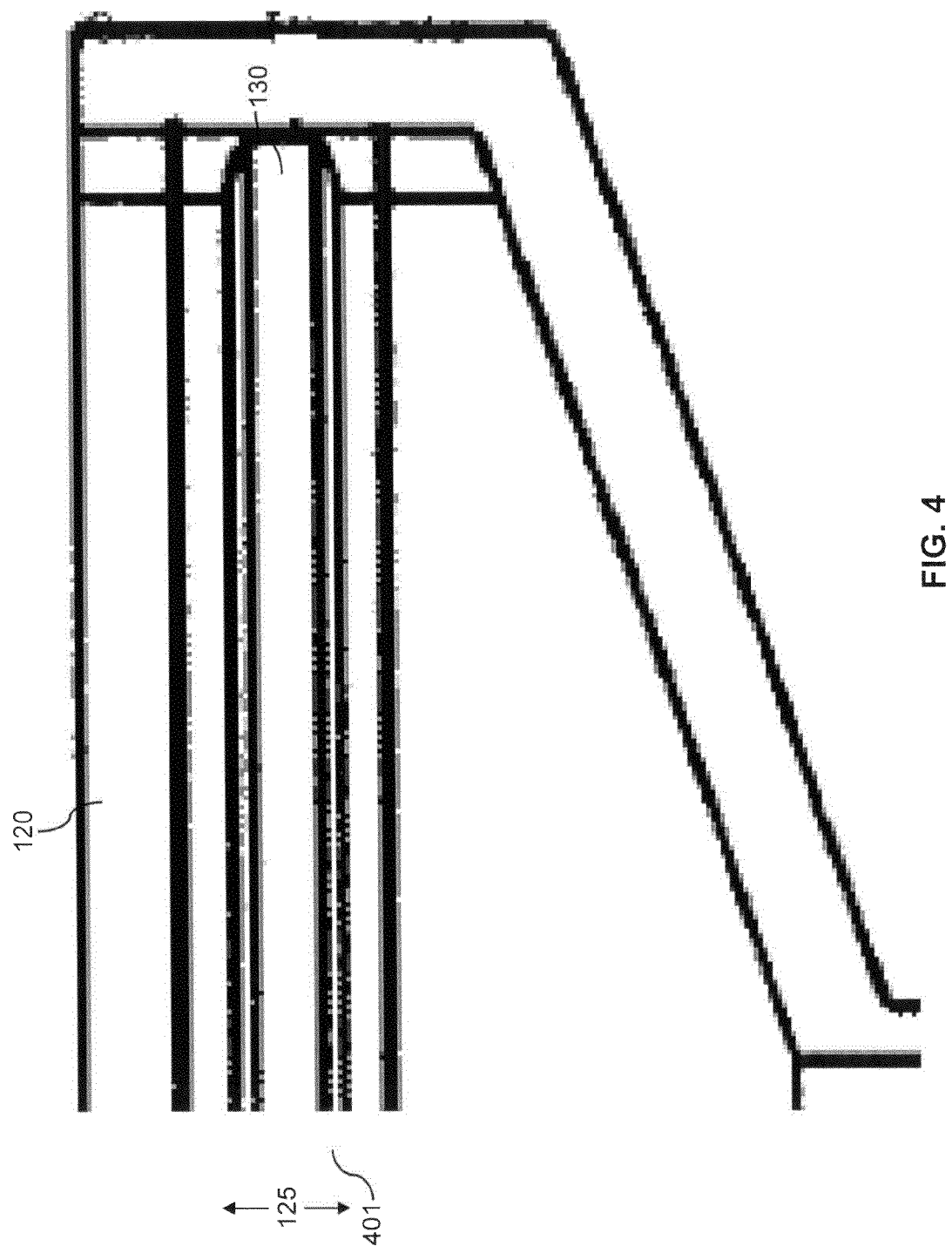
FIG. 4 is an exploded view of a portion of the gravity harvester of FIG. 1C.

In one or more embodiments, the stopper 130 can be disposed within the central web channel 125. Referring to FIG. 4, the width of the central web channel 125 is preferably greater than the width of the stopper 130, thereby creating a gap, facilitating and controlling upstream vertical displacement 401 (i.e. vertical displacement of the movable platform 120).

The top flange 122 can further include a treadle area 121 which is a top, flat surface of the top flange. The treadle area 121 receives compression directly from the weight of a vehicle or a pedestrian as the vehicle or the pedestrian tramples or treads on it.

The bottom flange 128 can further include a bottom surface 129 that is in direct contact with the fluid 118 in the reservoir 112.

The fluid 118 can be any hydraulic fluid or incompressible fluid in liquid form, preferably a mineral oil which can be a mixture of higher alkanes from a non-vegetable (mineral) source, such as a distillate of petroleum. In some embodiments, water can be used as the fluid 118. In addition to incompressibility, the fluid 118 preferably also possesses characteristics such as low volatility and low foam tendency.

An incompressible fluid is defined as a fluid whose density does not change or exhibits negligible change, in response to mechanical stress or pressure. Mathematically, the incompressibility of the fluid 118 can be expressed as:

$$d\rho/dt \approx 0 \quad \text{(Equation 1)}$$

that is, the density, $\rho$ of the fluid 118 does not change as it moves in a flow field (i.e. the reservoir 112), and d/dt is the substantial derivative or material derivative.

The compressibility/incompressibility of the fluid 118 can also be measured by its bulk modulus, K or B, which is the fluid's resistance to uniform resistance and is defined defined as the ratio of the infinitesimal pressure increase to the resulting relative decrease of the volume by the following Equation 2:

$$K = -V\frac{dP}{dV} \quad \text{(Equation 2)}$$

where P is pressure, V is volume, and dP/dV denotes the derivative of pressure with respect to volume. Equivalently, $$K = \rho\frac{dP}{d\rho} \quad \text{(Equation 3)}$$

where $\rho$ is density and $dP/d\rho$ denotes the derivative of pressure with respect to density. In one or more embodiments, the bulk modulus (K) of the fluid 118 is at least $10^8$ Pa, more preferably at least $10^9$ Pa.

At any given point, whether the movable platform 120 is being compressed or not, the fluid 118 is in direct contact with the bottom surface 129 and the piston 140. When the weight of an overpassing vehicle or pedestrian received upon the treadle area 121 pushes the movable platform 120 downward to create the upstream vertical displacement 401, the fluid 118, being incompressible or non-compressible, can act as a medium to transfer the mechanical energy completely with no energy loss to the piston 140, thereby resulting in a downstream vertical displacement 502 (see FIG. 5).

The downstream vertical displacement can be amplified by up to two orders of magnitude by the funnel shape of the vessel 110. The upstream vertical displacement 401 and the downstream vertical displacement 502 are associated with an upstream volume displacement and a downstream volume displacement, respectively. The upstream volume displacement must be equal to the downstream volume displacement. The decrease in the cross section area from the upper portion (rectangle) to the lower portion (circle) of the rectangular funnel-shaped vessel 110 by one to two orders of magnitude is compensated by an increase in the downstream vertical displacement, also by one to two orders of magnitude.

In one or more embodiments, the upstream vertical displacement 401 is within the range of 0.05-0.25 cm, or $5.0 \times 10^{-4}$ m to $2.5 \times 10^{-3}$ m.

In one or more embodiments, the downstream vertical displacement 502 is within the range of 0.5 m-2.5 m, or $5.0 \times 10^{-1}$ m to 2.5 m.

Referring again to FIGS. 3A-3D, the top flange 122 and the bottom flange 128 each include an elastomeric gasket strip (123 and 127, respectively) wrapped around the front (see FIG. 3C), rear and side surfaces (see FIG. 3D). The gasket strips 123, 127 function as mechanical seals to fill spaces between the movable platform 120 and the vessel 110. More importantly, the gasket strips 123, 127 prevent the fluid 118 from leaking, especially when the treadle area 121 is being compressed by the weight of a vehicle or a pedestrian.

The gasket strips 123, 127 are preferably made of an elastomeric material such as natural rubber, synthetic rubber, thermoplastic elastomer (TPE) or combinations and copolymers thereof. Thermoplastic elastomers (TPE), sometimes referred to as thermoplastic rubbers, are a class of synthetic copolymers or a physical mix of polymers (usually a plastic and a rubber) with both thermoplastic and elastomeric properties. Examples of commercial TPEs that may be used to make the gasket strips 123, 127 include styrenic block copolymers (TPE-s), polyolefin blends (TPE-o), elastomeric alloys (TPE-v), thermoplastic polyurethanes (TPU), thermoplastic copolyester and thermoplastic polyamides (TPE-a), silicone elastomers, latex materials, styrene-butadiene rubber, SEBS rubber or any other TPEs known in the art and combinations thereof.

In one or more embodiments, the vessel 110 and the movable platform 120 have rounded corners so that the gasket strips 123, 127 may be more evenly applied to seal the spaces between the vessel and the movable platform. Accordingly, since the movable platform 120 is enclosed within the rectangular mouth 116 with no gap, the rectangular mouth can also have rounded corners.

Additionally, the gasket strips 123, 127, due to their elastomeric properties, return the movable platform 120 to its original position after it is released from the compression of a vehicle or a pedestrian.

Figure 5:
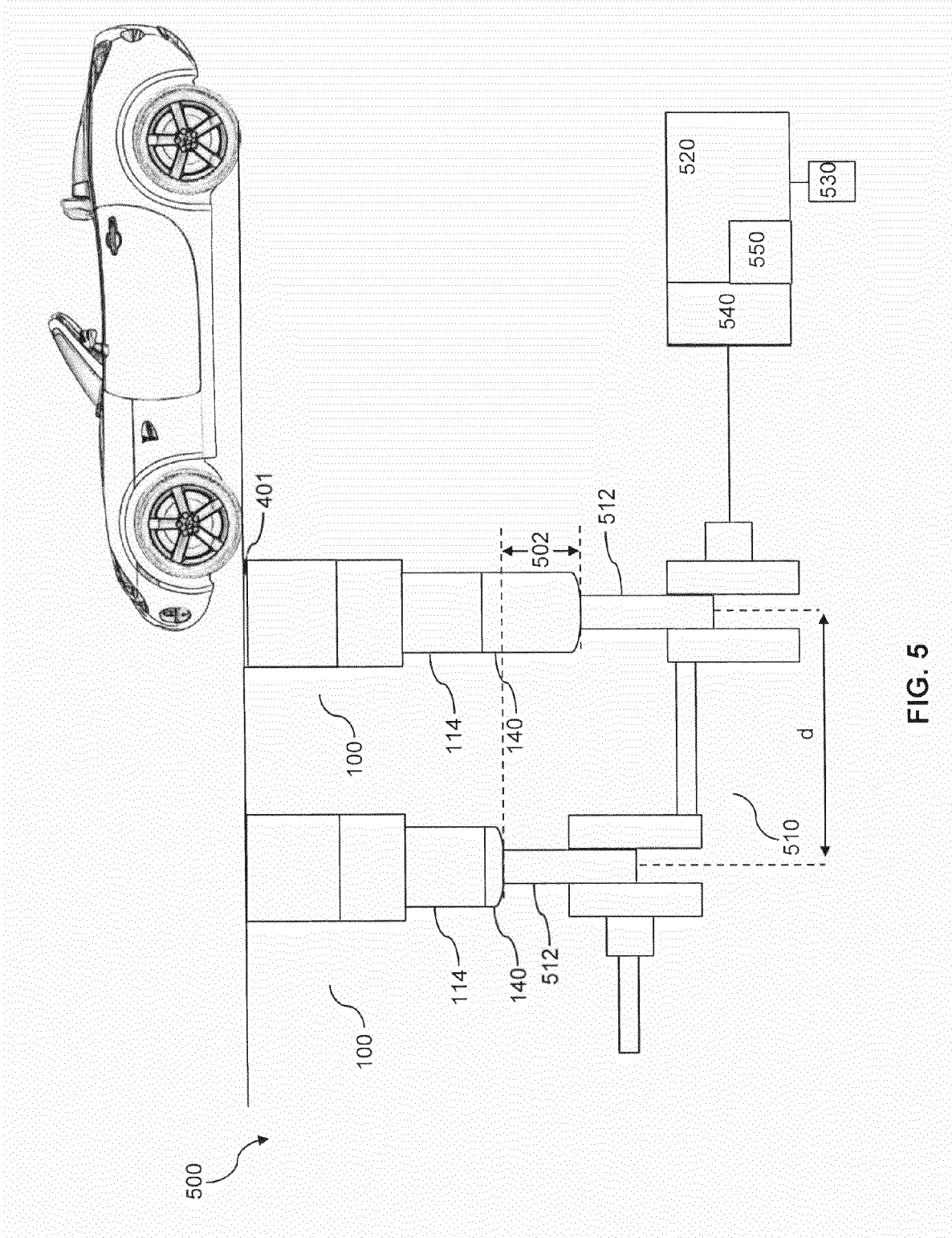
FIG. 5 illustrates a system incorporating the gravity harvester of FIGS. 1A-1D for generating electricity power.

The present disclosure also relates to a power generation system 500, as shown in FIG. 5, comprising at least a crankshaft 510 and an electricity generator 520, to which one or more gravity harvesters 100 can be connected, to convert the downstream vertical displacement 502 into rotational motion which in turns a rotor within a stator to generate electricity. The electricity is optionally stored in a storage mechanism 530, such as a battery or a bank of capacitors. The electricity generator 520 or the storage mechanism 530 is connected to a local power grid for providing power either for local uses or to provide energy to a larger private or public grid.

The piston 140 comprises at least the following standard parts: a main cylinder, a crown, a plurality of piston rings that make the piston fluid-tight (thereby preventing leakage of the fluid 118), a plurality of ring grooves for retaining the piston rings and a skirt. A connecting rod 512, which can be attached to the piston 140 with a gudgeon pin or a wrist pin, connects each piston to the crankshaft 510.

The crankshaft 510 translates reciprocating linear motion of the one or more pistons 140 (repetitive downstream vertical displacement 502 as induced by weight compression and the piston returning to its original position as induced by crank rotation) into rotational motion, or torque.

The mechanical energy of the rotational motion of the crankshaft 510 is used to drive the electricity generator 520 to generate electricity. Examples of the electricity generator 520 include but are not limited to, an electric motor, a dynamo (direct current), an alternator (alternating current), a rotor and a stator, all of which have the common principle of using the mechanical energy supplied (from the crankshaft) to force the movement of electric charges present in the wire of their windings through an external electric circuit.

The electricity generated by the electricity generator 520 can be used to illuminate a public road, to power traffic lights, variable-message signs (electronic traffic signs), roadside LEDs and traffic cameras as needed. Additionally, the power generation system 500 can further comprise batteries and capacitors to store the electricity output.

To ensure that the crankshaft 510 rotates in a single direction and to prevent destructive interference upon the crankshaft that can cause it to rotate in a reverse direction, the distance or spacing between any two gravity harvesters can be equilibrated or optimized with the speed limit of a public road wherein the power generation system 500 is installed. Typically, the higher a speed limit of a public road and assuming that a vehicle is traveling at a constant speed (without acceleration or deceleration) within the speed limit and at the maximum allowed speed, the greater the calculated distance would be between two gravity harvesters.

Another assumption that can be made when calculating an optimum distance between two gravity harvesters is that the time taken for a piston and a movable platform of a gravity harvester to return their original positions after displacements exceeds the time taken for the front wheels and the rear wheels of a vehicle to overpass the gravity harvester sequentially at a given speed.

Further, the power generation system 500 can comprise additional components and devices, such as a flywheel and/or a gearbox 540 connected to the crankshaft 510, before the rotational motion is received by the electricity generator 520. The flywheel can be a rotating disc that absorbs and stores the torque from the crankshaft. The gearbox 540, including a plurality of speed-changing gears and gear trains, provides and regulates speed and torque conversions from the crankshaft to the electricity generator.

A spacing "d" between the gravity harvesters 100 is set to match a speed limit on the road on which the harvesters 100 are deployed. Since 1 mile per hour corresponds with 1.466 feet per second (ft/s), and a typical car has a wheel base of about 10 feet, the tires of the wheel base move about 14 feet for each 10 miles per hour the car is traveling.

Accordingly, for a fixed pitch between two gravity harvesters 100, for example, 10 feet, a car traveling at 40 miles per hour would have its front tires move over the two harvesters at a rate about 60 ft/s. Thus, if the two harvesters are spaced 6 feet apart, the tires would move over the second harvester 0.1 s after the first.

Accordingly, the gearbox 540 can be set to an input rotation rate of 10 turns per second to produce a fixed output turn rate of, for example, 60 turns per second. However, if the power generation system 500 is installed on a road with a different speed limit, a technician can input into a smartphone application the new speed limit and the new speed limit is transmitted wirelessly to gearbox 540, where a central processing unit (CPU) of a computer system 550 changes the gear ratio to be consistent with the speed limit of the road.

Figure 6:
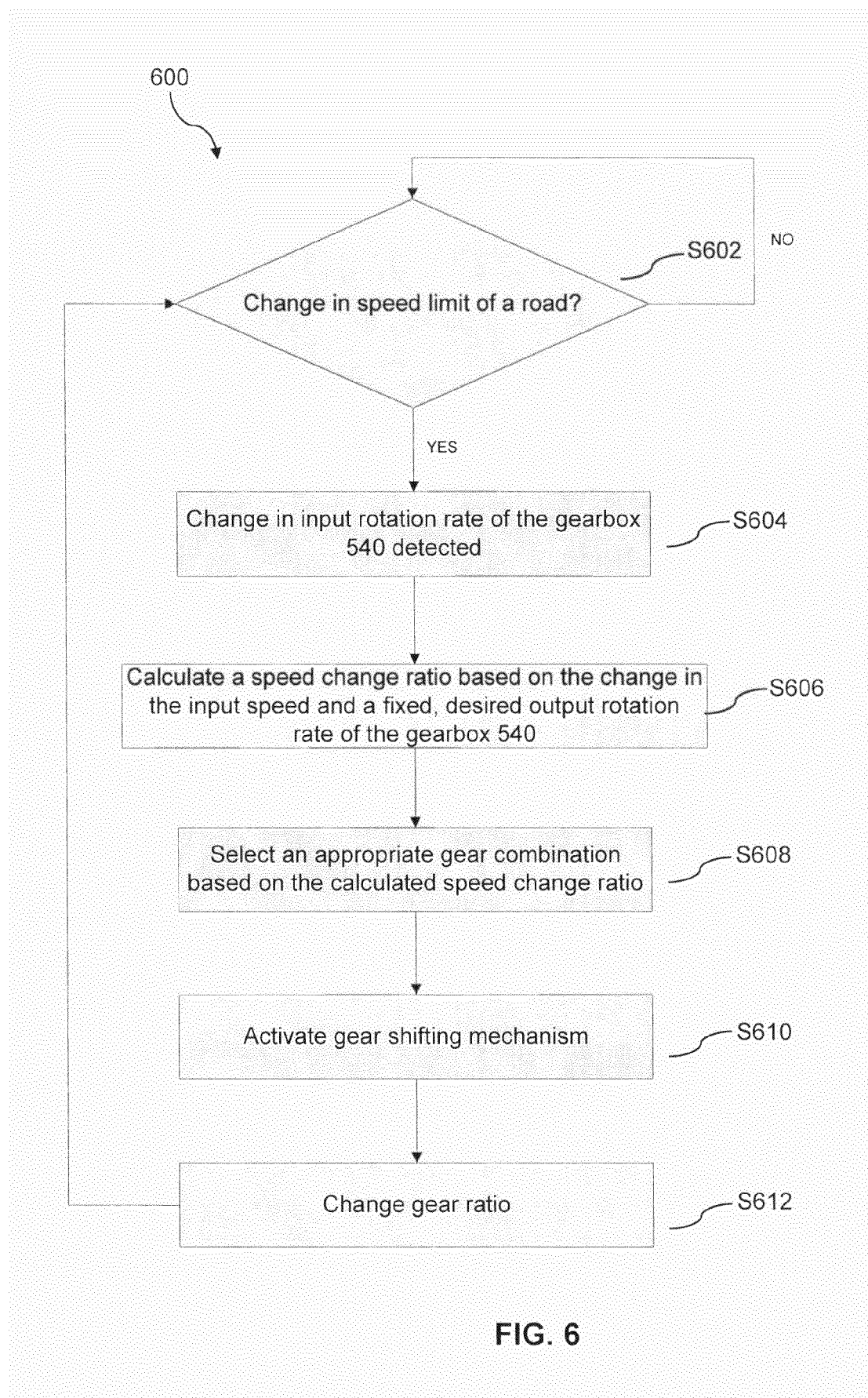
FIG. 6 is a flowchart of a process of changing the gear ratio of a gearbox in response to a change in speed limit according to one embodiment.

FIG. 6 is a flowchart of a process of changing the gear ratio of the gearbox 540 in response a change in speed limit. The process 600 begins at step S602 which is a waiting state where the computer system 550 awaits a change in speed limit. When a change in speed limit occurs, a change in the input rotation rate at the gearbox 540 is detected by the computer system 550 at step S604. At step S606, the computer system 550 is configured to calculate and determine a speed change ratio based on the change in the input rotation rate and a fixed, desired output rotation rate of the gearbox 540. Further, at step S608, the computer system is configured to select an appropriate gear combination based on the calculated speed change ratio. At step S610, a gear shifting mechanism at the gearbox 540 is activated to change the gear ratio at step S612 to be consistent with the new speed limit.

Yet further, examples of peripheral devices that can be added into the power generation system 500 include a photodetector to detect sunlight and turn off road lighting during the day, a weight sensor and a pressure regulator.

FIGS. 7A and 7B depict different embodiments of the installation of the gravity harvester 100. In the embodiment of FIG. 7A, the gravity harvester 100 can be installed underneath any one of the previously described predetermined surfaces, so that the treadle area 121 and the rectangular mouth 116 align with the surface 700. The surface 700 may be a road surface, a rail surface, a floor surface, the surface of any walking area or the surface of area wherein a land vehicle may overpass, such as at a weigh station checkpoint along a highway.

In an alternative embodiment in FIG. 7B, to create a raised pedestrian crosswalk or a speed bump (i.e. a vertical deflection to slow down or calm traffic to improve safety conditions), the gravity harvester 100 can be installed so that up to 10 cm of the upper portion of gravity harvester 100 is above the surface 700. According to U.S. Department of Transportation stipulations, speed bumps (including variations such as speed hump, speed ramp, speed cushion and speed table) have a maximum height of 10 cm, but a height of 6.5 cm to 7.5 cm is recommended.

Figure 8:
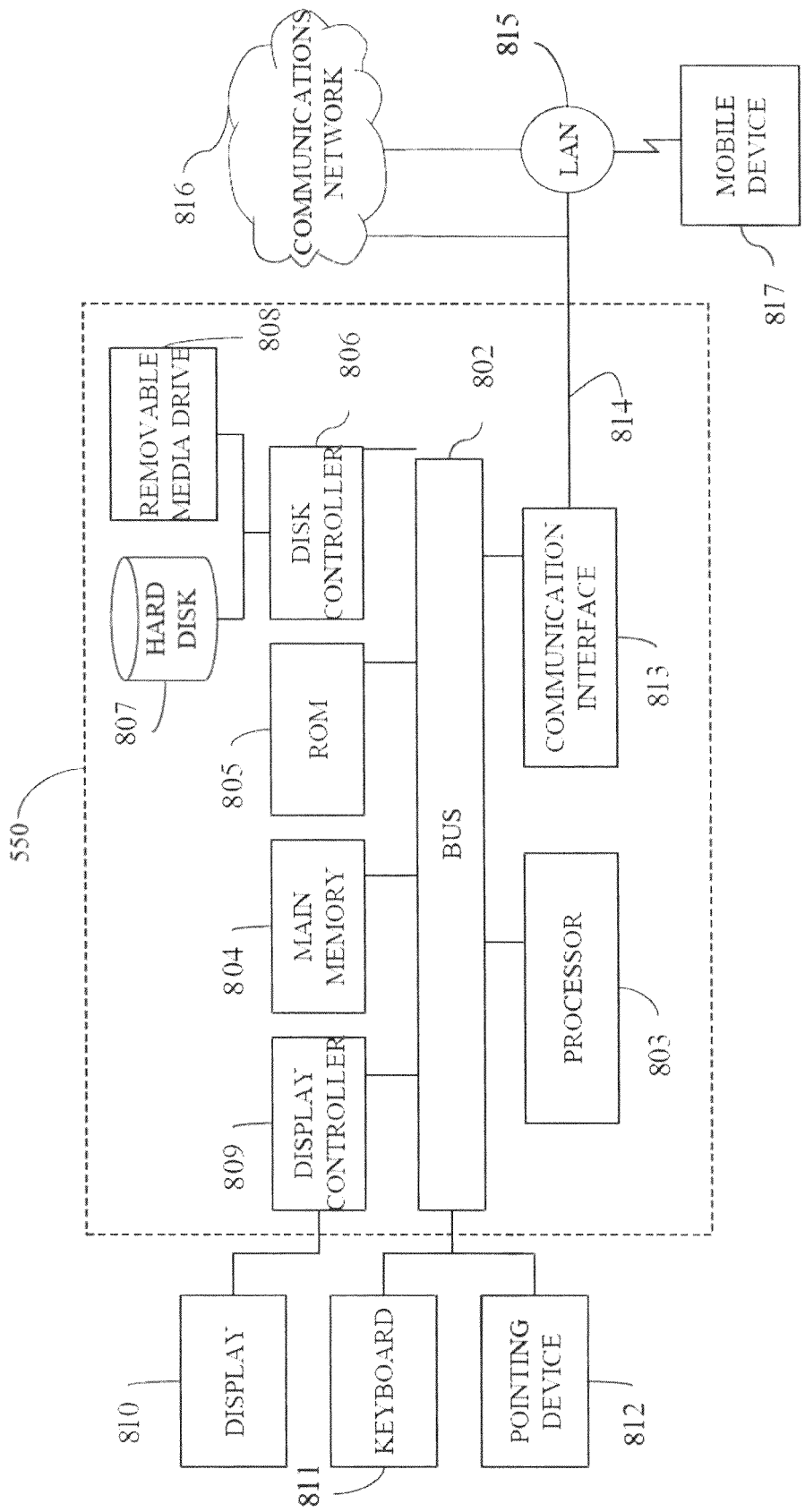
FIG. 8 illustrates the parameters of the movable platform of the gravity harvester for the calculations of upstream volume displacement.
Figure 9:
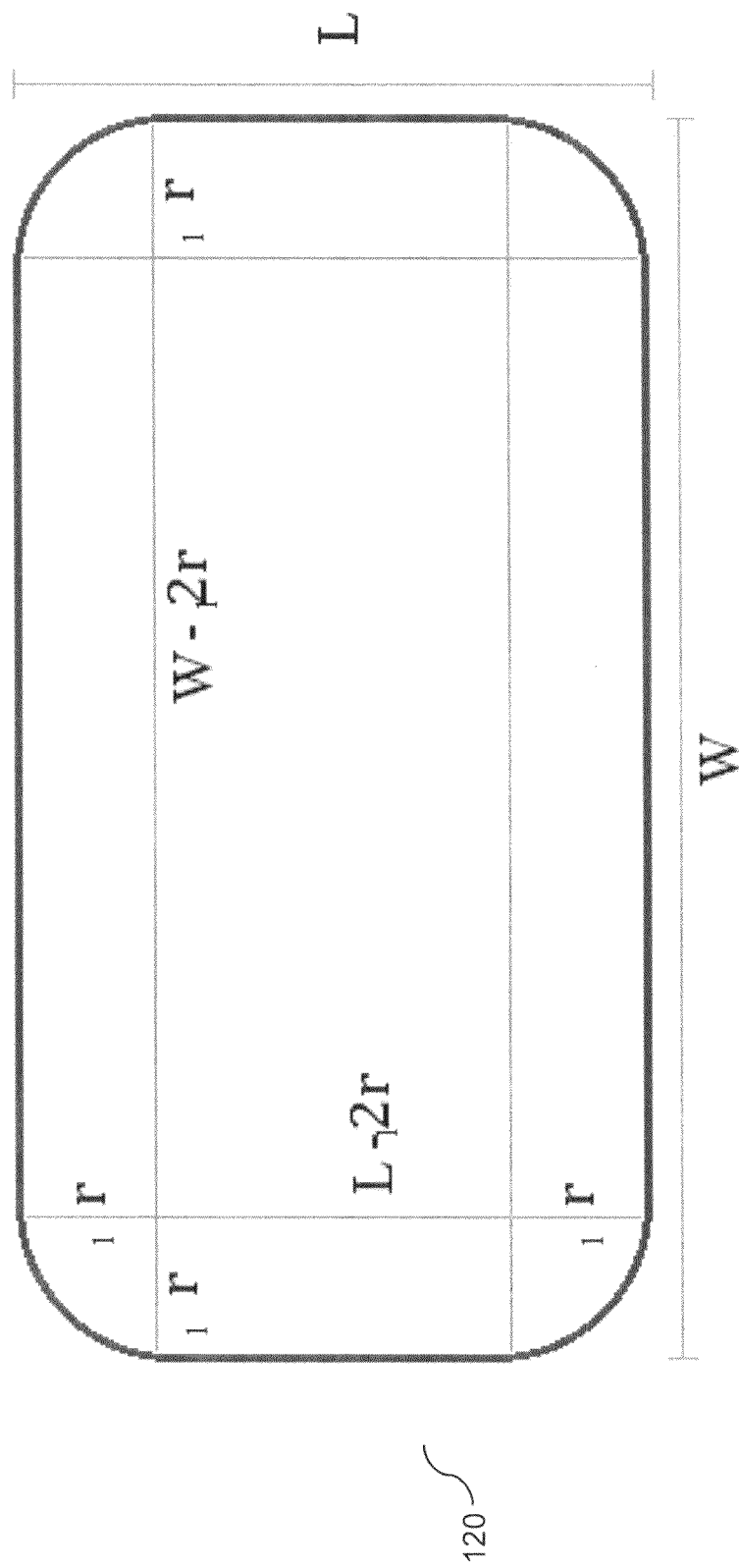
FIG. 9 illustrates an exemplary computer system upon which changing of a gear ratio of a gearbox can be implemented.

FIG. 8 an exemplary computer system upon which changing of a gear ratio of the gearbox 540 can be implemented. The computer system 801 includes a bus 802 or other communication mechanism for communicating information, and a processor 803 coupled with the bus 802 for processing the information. The computer system 801 also includes a main memory 804, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 803. In addition, the main memory 804 may be used for storing temporary variables or other intermediate information during the execution of instructions by the processor 803. The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 550 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 550 using an appropriate device interface (e.g., small computer system interface (SCSI), integrated device electronics (IDE), enhanced-IDE (E-IDE), direct memory access (DMA), or ultra-DMA).

The computer system 550 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 550 may also include a display controller 809 coupled to the bus 802 to control a display 810, such as a cathode ray tube (CRT), for displaying information to a computer user. The computer system includes input devices, such as a keyboard 811 and a pointing device 8212, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of data stored and/or generated by the computer system 550.

The computer system 550 performs a portion or all of the processing steps of the invention in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 550 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 550, for driving a device or devices for implementing the invention, and for enabling the computer system 550 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 803 for execution. A computer readable medium may take many forms, including but not limited to, non-volatile media, volatile media, and transmission media. Non-volatile media includes, for example, optical, magnetic disks, and magneto-optical disks, such as the hard disk 807 or the removable media drive 808. Volatile media includes dynamic memory, such as the main memory 804. Transmission media includes coaxial cables, copper wire and fiber optics, including the wires that make up the bus 802. Transmission media also may also take the form of acoustic or light waves, such as those generated during radio wave and infrared data communications.

Various forms of computer readable media may be involved in carrying out one or more sequences of one or more instructions to processor 803 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 550 may receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 804, from which the processor 803 retrieves and executes the instructions. The instructions received by the main memory 804 may optionally be stored on storage device 807 or 808 either before or after execution by processor 803.

The computer system 550 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a network interface card to attach to any packet switched LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc). The signals through the various networks and the signals on the network link 814 and through the communication interface 813, which carry the digital data to and from the computer system 550 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 550 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

The computer system 550 can additionally include a general purpose I/O interface that connects a plurality of peripheral devices such as but not limited to display 810, keyboard 811 and pointing device 812 to the processor 803.

The examples below are intended to further illustrate mathematical equations for calculating the values of upstream vertical displacement, upstream volume displacement, downstream vertical displacement and downstream volume displacement based upon exemplary dimensions of the gravity harvester 100 described herein. These examples are not intended to limit the scope of the claims. The gravity harvester 100 is also not limited by the exemplary dimensions outlined in the examples below and alternate methods and formulas may substitute the equations below.

Example 1

Exemplary estimated dimensions of the movable platform 120 and calculations of the upstream volume displacement 401

Referring to FIG. 7, wherein a top plane view of the movable platform 120 with rounded corners is shown:

Length$_{movable\ platform}$, L=0.25 m

Width$_{movable\ platform}$, W=2.5 m (approximately the width of a standard lane of a public road)

Radius$_{rounded\ corner}$, $r_1$=0.025 m. Therefore, $$\text{Area}_{movable\ platform}=LW-4r_1^2+\pi r_1^2=(0.25\times2.5)-(4-\pi)(0.025^2)=0.624\ m^2 \quad \text{(Equation 4)}$$

Let the upstream vertical displacement, $V_1$, be 0.002 m or $2\times10^{-3}$ m. Therefore, $$\text{Upstream volume displacement}=\text{Area}_{movable\ platform}\times V_1=0.624\times0.002=0.00124\ m^3\ \text{or}\ 1.2\times10^{-3}\ m^3 \quad \text{(Equation 5)}$$

Example 2

Exemplary Estimated Dimensions of the Piston 140 and Calculations of the Downstream Vertical Displacement 502

Radius$_{piston}$, $r_2$=0.05 m. Therefore, $$\text{Area}_{piston}=\pi r_2^2=\pi\times0.05^2=7.85\times10^{-3}\ m^2 \quad \text{(Equation 6)}$$

Since the upstream volume displacement is equal to the downstream volume displacement:

Upstream volume displacement=Downstream volume displacement

Upstream volume displacement=Area$_{piston}\times$downstream vertical displacement. Therefore, $$\text{Downstream vertical displacement}=\text{Upstream volume displacement}/\text{Area}_{piston}=1.2\times10^{-3}/7.85\times10^{-3}=0.153\ m\ \text{or}\ 1.5\times10^{-1}\ m \quad \text{(Equation 7)}$$

Therefore, in Examples 1 and 2 above, an upstream vertical displacement of $2\times10^{-3}$ m can result in a downstream vertical displacement of $1.5\times10^{-1}$ m (75 times amplification or amplification by two orders of magnitude).

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A device for converting a weight of an overpassing vehicle or pedestrian into mechanical energy, comprising:
   a vessel of a rectangular funnel shape having a rectangular mouth and a rectangular cross section at an upper portion, a reservoir in a middle portion, a stem with a circular cross section at a lower portion;
   a movable platform having an I-shaped cross section disposed inside the upper portion and enclosed by the rectangular mouth, the movable platform including a top treadle area, a top flange, a bottom flange and a central web channel disposed between the top flange and the bottom flange;
   a piston disposed inside the stem at the lower portion; and
   an incompressible fluid contained in the reservoir and is in contact with the movable platform and the piston,
   wherein the rectangular cross section is greater than the circular cross section,
   wherein the movable platform is configured to receive the weight of the overpassing vehicle or pedestrian at the top treadle area and drop to produce an upstream vertical displacement,
   wherein the incompressible fluid is configured to receive the upstream vertical displacement from the movable platform and to transfer the upstream vertical displacement to the piston,
   wherein the piston is configured to receive the upstream vertical displacement from the incompressible fluid and drop to produce a downstream vertical displacement, and
   wherein the downstream vertical displacement is greater than the upstream vertical displacement.

2. The device of claim 1, further comprising:
   a stopper disposed inside the central web channel across the width of the vessel and is joined to at least two inners walls of the vessel;
   wherein the central web channel has a width that is greater than the width of the stopper to allow movement of the movable platform; and
   wherein the stopper is configured to control and limit the upstream vertical displacement.

3. The device of claim 1, further comprising:
   one or more elastomeric gasket strips wrapping around the movable platform;
   wherein the one or more elastomeric gasket strips are configured to fill spaces between the movable platform and the vessel, to prevent leakage of the incompressible fluid and to return the movable platform to the original movable platform position after the movable platform is released from the weight of the overpassing vehicle or pedestrian.

4. The device of claim 1, wherein the downstream vertical displacement is one to two orders of magnitude greater than the upstream vertical displacement.

5. The device of claim 1, wherein the downstream vertical displacement is within the range of 0.5 m-2.5 m.

6. The device of claim 1, wherein the upstream vertical displacement of within within the range of 0.05-0.25 cm.

7. The device of claim 1, wherein the device is constructed of a rigid, non-flexible metallic material selected from the group consisting of aluminum, iron, copper, mixtures and alloys thereof.

8. The device of claim 1, wherein the device is installed underneath a predetermined surface selected from the group consisting of road surface, rail surface, floor surface, surface of a walking area, a weigh station checkpoint along a highway and a pedestrian crosswalk.

9. The device of claim 8, wherein the top treadle area and the rectangular mouth align with predetermined surface.

10. The device of claim 8, wherein the top treadle area and the rectangular are up to 10 cm above the predetermined surface.

11. A system for generating electricity from a weight of an overpassing vehicle or pedestrian, comprising:
    at least two gravity harvesters, each comprising:
      a vessel of a rectangular funnel shape having a rectangular mouth and a rectangular cross section at an upper portion, a reservoir in a middle portion, a stem with a circular cross section at a lower portion;
      a movable platform having an I-shaped cross section disposed inside the upper portion and enclosed by the rectangular mouth, the movable platform including a top treadle area, a top flange, a bottom flange and a central web channel disposed between the top flange and the bottom flange;
      a piston disposed inside the cylindrical stem at the lower portion; and
      an incompressible fluid contained in the reservoir and is in contact with the movable platform and the piston; and
    a crankshaft mechanically connected to the gravity harvesters; and
    an electricity generator connected to the crankshaft,
    wherein the rectangular cross section is greater than the circular cross section,
    wherein the movable platform is configured to receive the weight of the overpassing vehicle or pedestrian at the top treadle area and drop to produce an upstream vertical displacement,
    wherein the incompressible fluid is configured to receive the upstream vertical displacement from the movable platform and to transfer the upstream vertical displacement to the piston,
    wherein the piston is configured to receive the upstream vertical displacement from the incompressible fluid and drop to produce a downstream vertical displacement,
    wherein the downstream vertical displacement is greater than the upstream vertical displacement,
    wherein the crankshaft is configured to translate the downstream vertical displacement into rotational motion and return the piston to the original piston position, and
    wherein the electricity generator is configured to convert the rotational motion into electricity.

12. The system of claim 11, wherein the gravity harvesters each further comprise:
    a stopper disposed inside the central web channel across the width of the vessel and is joined to at least two inners walls of the vessel;
    wherein the central web channel has a width that is greater than the width of the stopper to allow movement of the movable platform; and
    wherein the stopper is configured to control and limit the upstream vertical displacement.

13. The system of claim 11, wherein the gravity harvesters each further comprise:

one or more elastomeric gasket strips wrapping around the movable platform;

wherein the one or more elastomeric gasket strips are configured to fill spaces between the movable platform and the vessel, to prevent leakage of the incompressible fluid and to return the movable platform to the original movable platform position after the movable platform is released from the weight of the overpassing vehicle or pedestrian.

14. The system of claim 11, wherein the downstream vertical displacement is one to two orders of magnitude greater than the upstream vertical displacement.

15. The system of claim 11, wherein the downstream vertical displacement is within the range of 0.5 m-2.5 m.

16. The system of claim 11, wherein the upstream vertical displacement of within the range of 0.05-0.25 cm.

17. The system of claim 11, wherein the gravity harvesters are each constructed of a rigid, non-flexible metallic material selected from the group consisting of aluminum, iron, copper, mixtures and alloys thereof.

18. The system of claim 11, wherein the top treadle area and the rectangular mouth align with predetermined surface.

19. The system of claim 11, wherein the top treadle area and the rectangular are up to 10 cm above the predetermined surface.

20. The system of claim 11, further comprising a gearbox with a central processing unit that changes a gear ratio based on a received signal that corresponds to a speed limit.

* * * * *